Patented Mar. 19, 1929.

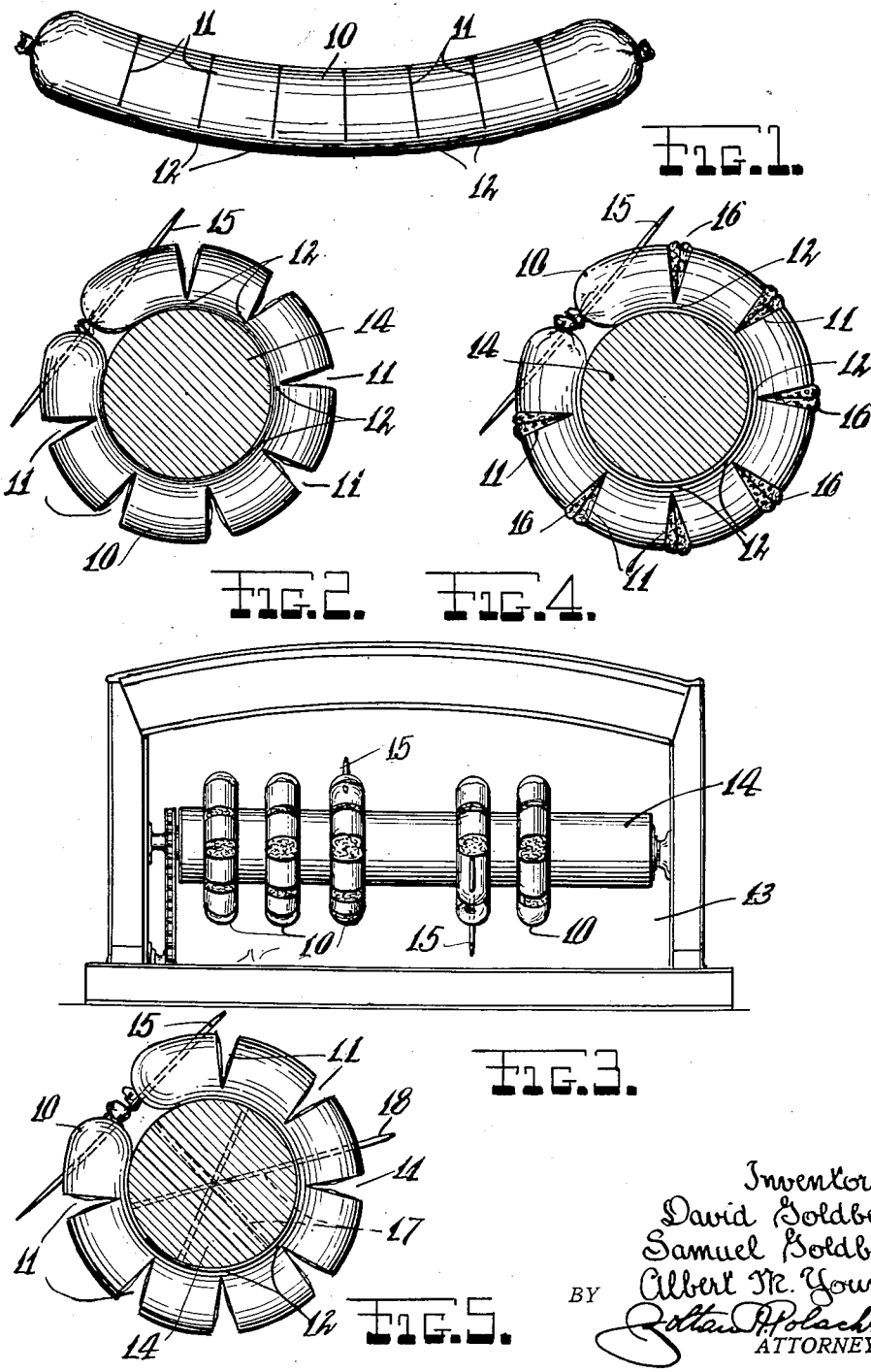

1,706,225

UNITED STATES PATENT OFFICE.

DAVID GOLDBERG, SAMUEL GOLDBERG, AND ALBERT M. YOUNG, OF BROOKLYN, NEW YORK.

METHOD OF ROASTING AND BROILING FRANKFURTERS.

Application filed April 13, 1928. Serial No. 269,652.

This invention relates generally to the art of meat roasting, and has more particular reference to a novel method for roasting Frankfurters or the like, and to the article itself.

The invention has for an object the provision of a method of the class mentioned which is composed of very simple steps, and is desirable and efficient in use, and which can be applied and carried out at a reasonable cost.

The method proposes the formation of transverse incisions in the Frankfurter or similar article, these incisions being limited as extending from one side to a small distance from the other side so as to leave a small portion of uncut skin. The Frankfurter is next bent around the roasting bar of a roaster, and a toothpick of common construction forced thru both free ends thereof for holding it in place on the bar. As the Frankfurter is gradually roasted, the meat therein will gradually expand and project from the incisions.

The finished article itself, that is the roasted Frankfurter consists of a skin with meat therein and formed with a plurality of incisions thru which the freshly roasted meat projects for holding the Frankfurter in substantially circular formation.

For further comprehension of the invention, and of the objects and advantages thereof, reference will be had to the following description and accompanying drawings, and to the appended claims in which the various novel features of the invention are more particularly set forth.

In the accompanying drawings, forming a material part of this disclosure:

Fig. 1 is a side elevational view of a Frankfurter formed with incisions prior to forming.

Fig. 2 is a transverse vertical sectional view of a roasting rod with the Frankfurter applied thereto.

Fig. 3 is a front elevational view of a roaster for roasting the Frankfurters.

Fig. 4 is a view similar to Fig. 2 but showing the Frankfurters in roasted condition.

Fig. 5 is another similar view, but of modified form.

The reference numeral 10 indicates generally a Frankfurter formed with a plurality of incisions 11 extending from one side thereof to a small distance from the other side so as to leave uncut skin portions 12.

The reference numeral 13 indicates generally a roaster provided with a rotatable roasting bar 14. The Frankfurter 10 is placed around the bar 14 and a toothpick 15 is passed thru the ends thereof for holding it as placed. Fig. 2 shows the Frankfurter in this condition.

In Fig. 3 a plurality of Frankfurters are shown on the bar 14, and as this bar turns, the Frankfurters will gradually become roasted, and the meat therein will expand and tend to fill the incisions as indicated by the numeral 16.

Frankfurters roasted in this way are very appetizing and juicy, and besides they look very attractive. After roasting, the toothpicks 15 may be removed and they will maintain circular formation due to the filled incisions 11. They may be served in circular rolls or bread, though this is not intended as a limitation.

In Fig. 5, a roasting bar 14' is illustrated, formed with a plurality of apertures 17. A toothpick 18 may be forced thru the Frankfurter 10 and into one of the apertures 17 for holding the Frankfurter against relative rotation on the bar.

While we have shown and described the preferred embodiment of our invention, it is to be understood that we do not limit ourselves to the precise construction herein disclosed and the right is reserved to all changes and modifications coming within the scope of the invention as defined in the appended claims.

Having thus described our invention what we claim as new and desire to secure by United States Letters Patent is:—

1. A method for roasting Frankfurters and the like, consisting of forming transverse incisions in the Frankfurters, extending from one side to a small distance from the other side so as to leave a small portion of uncut skin, bending the Frankfurters into circular form with the incisions on the outside, and upon a roasting bar, and then securing the free ends together.

2. A Frankfurter of the class described, comprising a skin with meat therein, and formed with a plurality of incisions, and in circular formation, the said meat being expanded to fill the incisions for holding the Frankfurter in substantially circular form.

In testimony whereof we have affixed our signatures.

DAVID GOLDBERG.
SAMUEL GOLDBERG.
ALBERT M. YOUNG.